(12) United States Patent
Kattenberg et al.

(10) Patent No.: US 6,506,433 B2
(45) Date of Patent: Jan. 14, 2003

(54) METHOD FOR RECOVERING AROMA CONCENTRATE FROM A CAFFEINE- OR THEOBROMINE-COMPRISING FOOD BASE MATERIAL

(75) Inventors: Hans Robert Kattenberg, Krommenie (NL); Jeroen Harold Anton Willemsen, Apeldoorn (NL); Herman Henk Nijhuis, Bennekom (NL); Dick Antonius Johannes Starmans, Ede (NL); Hendrik Derk Hoving, Wageningen (NL); Miranda Gertruida Maria Winters, Wageningen (NL)

(73) Assignee: ADM Cocoa B.V., Koog aan de Zaan (NL)

( * ) Notice: Subject to any disclaimer, the term of this patent is extended or adjusted under 35 U.S.C. 154(b) by 0 days.

(21) Appl. No.: 09/887,558

(22) Filed: Jun. 25, 2001

(65) Prior Publication Data

US 2002/0058092 A1 May 16, 2002

Related U.S. Application Data

(63) Continuation of application No. PCT/NL99/00802, filed on Dec. 23, 1999.

(30) Foreign Application Priority Data

Dec. 23, 1998 (NL) .............................................. 1010880

(51) Int. Cl.⁷ .............................. A23L 1/28; A23F 5/50; A23F 3/42; A23G 1/00
(52) U.S. Cl. ...................... 426/431; 426/432; 426/435; 426/386; 426/651
(58) Field of Search ................................ 426/431, 432, 426/435, 386, 651

(56) References Cited

U.S. PATENT DOCUMENTS

| | | |
|---|---|---|
| 3,392,027 A | 7/1968 | Hess |
| 3,579,349 A | 5/1971 | Mishkin et al. |
| 5,385,647 A | 1/1995 | Brueschke et al. |

FOREIGN PATENT DOCUMENTS

| | | |
|---|---|---|
| DE | 20 55 030 C3 | 5/1972 |
| DE | 38 04 236 A1 | 8/1989 |
| DE | 44 21 682 A | 2/1995 |
| EP | 0 332 738 B1 | 7/1994 |
| SE | 500 579 C | 7/1994 |

OTHER PUBLICATIONS

Karlsson, H., Application of pervaporation in food processing,: Trends in Food Science & Technology, vol. 7, No. 3, 1996, pp. 78–83.

Karlsson, H. "Aroma recovering during beverage processing," Journal of Food Engineering, vol. 34, 1997, pp. 159–178.

Baudot, A., "Pervaporation of aroma compounds," Food and Bioproducts Processing, vol. 25, No. c2, 1997, pp. 117–142.

Patent Abstracts of Japan, vol. 017, No. 355 (C–1079), Jul. 6, 1993, & JP 05 049840 A (Hitachi Zosen Corp.), Mar. 2, 1993.

Jenny Börjesson et al, "Pervaporation of a model apple juice aroma solution: comparison of membrane performance" Journal of Membrane Science, vol. 119, pp. .229–239, 1996.

Folexco Flavor Ingredients, "Natural Flavour Extracts and their use in the Flavour Industry" Food Tech Europe, pp. 48–54, Dec. 1994/Jan. 1995.

Ray Marsili, Ed., Techniques for Analyzing Food Aroma. Marcel Dekker, Inc. New York, pp. 31–32, 1997.

*Primary Examiner*—Anthony J. Weier
(74) *Attorney, Agent, or Firm*—Browdy and Neimark, P.L.L.C.

(57) ABSTRACT

Described is a method for recovering aroma concentrate from a caffeine- or theobromine-comprising food base material, such as coffee or tea, and in particular cocoa, at least including the steps of:

introducing the food base material into an aqueous extractant and incubating the food base material at a suitable temperature and for a suitable period, substantial extraction of the aromas taking place to form an aqueous food extract, pervaporating the food extract using a hydrophobic pervaporation membrane to form a food aroma permeate, recovering the permeate to obtain the aroma concentrate.

Also described are food concentrates obtainable via the abovementioned method.

20 Claims, 2 Drawing Sheets

METHOD FOR RECOVERING AROMA CONCENTRATE FROM A CAFFEINE- OR THEOBROMINE-COMPRISING FOOD BASE MATERIAL

This is a continuation application of PCT/NL99/00802, filed Dec. 23, 1999.

FIELD OF THE INVENTION

The invention relates to a method for recovering aroma concentrate from a caffeine- or theobromine-comprising food base material, such as coffee or tea, and in particular cocoa, at least comprising the steps of:
- introducing the food base material into an aqueous extractant and incubating the food base material at a suitable temperature and for a suitable period, substantial extraction of the aromas taking place to form an aqueous food extract,
- pervaporating the food extract using a hydrophobic pervaporation membrane to form a food aroma permeate,
- recovering the permeate to obtain the aroma concentrate.

BACKGROUND OF THE INVENTION

The term "aroma concentrate" in this context refers to an isolated mixture of aromatic substances as it exists in the base material, said mixture being present in a solvent, particularly water. Preferably, the recovered aroma concentrate substantially has an aroma profile which matches that of the base material, which is to say that the concentration ratio of the aromatic substances in the recovered aroma concentrate according to the invention substantially matches that of the aromatic substances in the base material. An aroma profile can be determined by methods known in the art, for example by means of dynamic headspace analysis (Dynamic Headspace; see T. P. Wampler, in Techniques for analysing food aroma, edited by P. Marsili, 1977, pp. 31–33, ISBN 0-8247-9788-4, and references therein). The invention therefore does not relate to the purification of a single chemical compound.

In the art, aroma concentrates obtained with the aid of steam distillation and liquid extraction are known. Reference is made in this context to U.S. Pat. No. 3,579,349 and to Food Tech Europe, December 1994/January 1995, pp. 48–54, respectively.

In the case of steam distillation, the high temperature results in thermal degradation of a considerable fraction of the aroma molecules, the product not having as full a taste as a result. In the case of liquid extraction, use is often made of organic solvents which must be removed completely from the extract obtained, which entails high costs and is problematic from an environmental point of view. Reference can be made in this context to DE-C-2 055 030.

U.S. Pat. No. 3,492,027 discloses a method for preparing a cocoa aroma by extracting cacao shells in boiling water. Such an extract, however, contains suspended particles, is brown in colour and contains purines, catechols and other water-soluble components such as proteins, carbohydrates and minerals, which considerably hamper further concentration of the desired aroma. In this context, purines mainly mean caffeine and theobromine. Catechols such as catechol, epicatechol and epigallocatechol are also known as antioxidants.

The pervaporation process is known per se in the art, see for an overview, e.g. Baudot and Marin, Food and Bioproducts Processing (1997) 75, pp 117–142. For separating azeotropic mixtures and for the dealcoholization of beverages, see for example DE-A-3 804236 and Karlsson and Tragardh, Trends in Food Science & Technology, 1996 (7), pp 78–83.

Also known per se in the art is the use of pervaporation to isolate individual aroma concentrates, i.e. to purify and separate individual chemical compounds (See e.g. DE-A 4 421 682).

Pervaporation is used especially to isolate aroma components from fruit juices, for example to obtain an aroma concentrate from apples. To this end, the juice is obtained from apples, and this juice is then subjected to pervaporation (see for example Borjesson et al., Journal of Membrane Science, Volume 119, 1996, pp. 229–239). The permeation conditions can be optimized by those skilled in the art in a simple manner, although in the case of fruit juices it did not prove possible to obtain an aroma concentrate having a satisfactory original aroma profile.

JP-A-05049840 describes a method for isolating a biologically active aroma concentrate from leaves of the medicinal plant Eucommia ulmoides. To this end, an aqueous extract of the leaves is subjected to permeation or pervaporation, the concentrate being recovered, however, on the primary side of the membrane, i.e. as the retentate. Pervaporation is thus used solely as a dehydration method; the aroma constituents do not pass through the pervaporation membrane.

A method of the above mentioned type for isolating seperate aroma components from in particular food juices is described in SE-C-500 579. In order to obtain desired concentration of aroma components, the hydrodynamics of the seed are altered. However, an aroma concentrate having an original aroma profile is not obtained.

The process of employing pervaporation to isolate an aroma concentrate having an aroma profile which substantially matches that of the base material in question (herein also referred to as "original aroma profile") is not known, however.

Surprisingly it is found that in the case of caffeine- and theobromine-comprising food base materials, particularly in the case of cocoa-containing base materials, pervaporation at elevated temperatures (i.e. 30° C. or more) can be used without the original aroma profile being lost. It is precisely at lower pervaporation temperatures that important aromatic substances will be partially retained in the retentate, so that a full aroma having the original aroma profile cannot be obtained.

In this context it is noted that pervaporation in the art, i.e. the isolation of odorous substances and flavourings, i.e. aromatic compounds, in contrast is carried out at lower temperatures. Those skilled in the art will choose precisely the pervaporation technique as a separation technique for mixtures comprising temperature-sensitive components (such as fruit juices, for example) and will therefore employ low temperatures. If such components are not present in the mixture to be separated they will predominantly use other thermal techniques such as steam-stripping and vacuum distillation.

SUMMARY OF THE INVENTION

The present invention therefor provides an improved method for recovering aroma concentrate from a caffeine- or theobromine-comprising food base material, such as coffee or tea, and in particular cocoa, of the above-discusses type, and is characterised in that the temperature of the extract and the permeate, respectively, during the pervaporation is more than 30° C.

It was found that the use of pervaporation according to the invention affords excellent aroma concentrates, in particular cocoa aroma concentrates, without valuable aromatic substances being lost during the preparation, which is to say that it is possible, via the method according to the invention, to obtain an aroma concentrate having an aroma profile which substantially matches that of the base material from which the aroma concentrate has been obtained (see example). It is also possible, via the method according to the invention, to obtain an aroma concentrate which substantially comprises all the desired aromatic substances from the base material which can be perceived by human taste and smell, as a result of which a "full" and "complete" aroma concentrate is obtained.

In addition, temperatures above room temperature are advantageous, as the fats present in the feed are then dissolved and as such cause fewer problems with clogging and fouling of the membrane. It should be noted that the said fats substantially do not pervaporate through the permeation membrane; consequently, the permeate is substantially fat-free.

It is important to note that the present inventors have established that as a result of pervaporation substantially no purines and catechols are present in the permeate obtained, the aroma becoming less bitter and astringent as a result, which is highly advantageous for preparing, for example, a purine-free coffee aroma, tea aroma or cocoa aroma. An aroma is thus obtained which in terms of smell and taste largely matches the smell and taste, respectively, of the starting material. Thus a cocoa aroma obtained according to the method of the present invention has a taste which is qualitatively comparable with the food base material cocoa powder.

Caffeine- or theobromine-comprising food base materials to be mentioned as suitable for use in the method according to the present invention include coffee beans, in particular of the varieties *Coffea arabica, Coffea canaphora robusta* and *Coffea liberica*, tea leaves, in particular of *Damillisa sinensis* and *Camelia assamica*, and cocoa-comprising foods, where cocoa-comprising foods include cocoa powder, cacao cake, cacao mass, cacao nibs and cacao shells, in particular of the variety *Theobroma cacao L*. Preferable among cocoa-comprising foods are cocoa powder and cacao cake. The food base materials suitable for the method according to the present invention are by no means limited to the abovementioned base materials. If desired, other plant parts which comprise caffeine or theobromine can be used to obtain a substantially caffeine- and theobromine-free extract. Substantially caffeine- and theobromine-free is meant to indicate that the concentration of these substances in the aroma is less than 0.0001 wt % (~0.001 g/l).

The food base material is introduced into an aqueous extractant, followed by incubation at a suitable temperature and over a suitable period, substantial extraction of the aromas taking place to form a food extract.

The term "substantial extraction" is understood to mean that as a result of extraction at least 10% of the aromatic substances present in the ultimate aroma concentrate, based on the total amount of the substance in question in the base material to be extracted, is taken up into the extractant; preferably this is at least 30%, yet more preferably at least 50% and most preferably more than 70%.

The advantage of aqueous extraction is that the solid particles and especially the not readily separable colloidal suspended particles need not be separated. It is sufficient for the coarser particles to be separated, for example by screening, to prevent blockages in the pervaporation.

It was found that the use of such an extraction step prior to the pervaporation allows a very good, full and substantially fat-free aroma to be obtained. As it is important that the membrane configuration will not become blocked during the pervaporation, it is advantageous to subject the extract to coarse filtration prior to the pervaporation step. It will be evident to those skilled in the art that the maximum particle size in the extract will depend on the membrane configuration to be used. If, for example, coated hollow fibres are used as the membrane configuration (see below), the maximum diameter of the particles in the extract should be smaller by approximately a factor of from 5 to 15, preferably a factor of 10, than the internal diameter of the hollow fibres. It should also be noted that a cocoa extract contains both dissolved and suspended particles.

Extracting the food base material, followed by pervaporation, renders any supplementary purification or acidification step of the extract unnecessary and enables the method to be implemented in mild process conditions, which allows valuable aromatic substances to be retained.

The term "aqueous extractant" refers to a liquid which mainly comprises water and into which preferably no fat or as little fat as possible is taken up.

For particular applications it may be advantageous for the extractant used to be a water-alcohol mixture, the alcohol content preferably being between 10–40% (v/v). By means of such an extractant it is possible to extract even aromas which are less soluble in water, a "fuller" aroma being obtainable as a result if desired. The term "fuller" means that aromas are obtained in a higher concentration and in a more natural ratio, as also present in the base material. However, if an organic solvent, for example, is used as an extractant, this should be removed substantially completely from the product obtained, since the product otherwise cannot be used for foods; moreover, the organoleptic properties are often impaired.

To avoid a supplementary purification step, the extractant is preferably water. This means, inter alia, tap water, distilled water and pyrogen-free water. It was found that if the extractant is water, a high-quality extract is obtained, using which a very "full" aroma product is obtained after pervaporation.

If water is used as the extractant, the weight ratio of food base material: water is preferably between 1:5 and 1:25. If the ratio is lower, the yield will be small, and if the ratio is higher, the base material, in particular cocoa, is often difficult to dissolve or suspend, respectively, in the water. Preferably, the base material: water ratio is between 1:9 and 1:11. It was found that with such a ratio at room temperature it is possible to dissolve enough base material for a good yield of aromas to be achievable. The advantage is that dissolution or mixing can be carried out at room temperature, so that warming is unnecessary. It is also possible to opt for the base material during the extraction to be dissolved or suspended, respectively, in the water. If the extraction takes place at a higher temperature, the base material will dissolve or become suspended, respectively, more efficiently in the extractant, causing a more concentrated material to be subjected to extraction, thus permitting an increased yield.

Most preferably, the ratio base material: water is 1:10. It was found that at such a ratio a good-quality extract can be obtained, the base material being dissolvable or mixable, respectively, in the water at room temperature prior to the extraction, without troublesome agglomeration or sedimentation of the base material taking place.

Advantageously, the temperature during the extraction is 90–125° C., since at lower temperatures not all the aromas are extracted, resulting in a lower-quality extract being obtained. At elevated temperatures there is a major risk of thermal degradation, valuable cocoa aromas being lost as a result. As already stated hereinabove, the cocoa can also be dissolved in the extractant during the extraction, more cocoa being capable of being dissolved owing to the higher temperature used as a rule, without troublesome agglomeration or sedimentation of the cocoa taking place in the extractant. In this context, reference is made to Example 1.

The efficiency of the extraction is determined not only by the extraction temperature used, but also by the duration of the extraction. It was found that with an extraction at 100–125° C., preferably between 105 and 115° C., most preferably between 105 and 110° C., an extraction time of one hour affords a good extract which can be subjected to the following pervaporation step. Reference is made to Example 2. It is obvious to those skilled in the art that at higher extraction temperatures it is possible to extract for a shorter time and the extraction period should be limited so as to cause no degradation of desired aromatic substances. On the other hand it is obvious that if lower extraction temperatures are used the extraction period will be longer.

The food in liquid and/or pumpable form is preferably cooled, prior to the pervaporation process, to below 80° C., as the polymeric pervaporation membranes used often become damaged above 80° C., thus adversely affecting the separation efficiencies of the pervaporation process.

The thickness of the pervaporation membrane is preferably at most 10 $\mu$m, more preferably at most 5 $\mu$m, most preferably at most 3 $\mu$m. In the art, on the other hand, pervaporation membranes having a thickness of 10 $\mu$m or more are used, to obtain a high selectivity for purifying individual aromatic substances. It was found that it is precisely with a thinner membrane according to the invention that an aroma concentrate having the original aroma profile can be obtained, with adequate selectivity against undesirable substances such as caffeine, theobromine, fats, catechols, proteins; furthermore, the amount of water which passes through the pervaporation membrane is limited. Likewise, it is possible using membranes having a thickness according to the invention, to achieve an improved yield.

It was found that if during the pervaporation process membranes are used which comprise coated hollow fibres, a product is obtained which has a full cocoa aroma. By making use of such hollow-fibre membranes it is possible to fabricate modules which have a low volume/surface ratio, thereby permitting a compact configuration of the membrane system with a high through-flow capacity. Equally, however, it is possible to use other membrane configurations such as flat films or spiral systems, although hollow-fibre membranes are to be preferred. Whilst homogeneous flat membranes do have good separation characteristics, they meet the mechanical requirements to a lesser extent and result in too low a yield. Spiral configurations often lead to problems with clogging and cleaning. Said problems can be prevented by the use of hollow-fibre membranes. Optimization of the diameter of the fibre and of the choice of membrane material provides hollow-fibre membranes which are highly suitable for use in the method according to the present invention.

Preferably, the hollow-fibre pervaporation membrane is internally coated with poly(dimethylsiloxane) (PDMS) and/or ethylene-propylene-diene monomer (EPDM). PDMS is commercially available, e.g. RTV 615A (trademark from GE Silicones). To enhance the mechanical strength as well as the durability it is advantageous for the polymeric PDMS chains to be cross-linked prior to use. This can be effected by means of the cross-linking agent RTV 615B from GE Silicones. EPDM, in many varieties, is marketed by DSM-Elastomers, inter alia. A good EPDM coating is formed by the type Keltan® 578 from DSM-Elastomers, which likewise should be cross-linked prior to use, for example with the aid of a peroxide such as dicumyl peroxide. In the case of internally coated hollow-fibre pervaporation membranes, the extract is passed through the hollow fibre (the feed side). On the other side of the membrane (the permeate side), water and especially the desired aromas are abstracted from the feed by a partial pressure difference across the membrane. After pervaporation an aroma-depleted retentate remains which, if desired, can be used for the recovery of the valuable substances which may still be present therein, such as catechols, fats and aromatic substances, in particular bitter flavourings which, if desired, can subsequently be added to the aroma concentrate according to the invention. It is also possible for the hollow-fibre membrane to be provided externally with a thin separating top layer of PDMS or EPDM. In this case, the feed is passed along the outside of the fibres and the permeate is formed in the interior of the fibres. This configuration is less suitable, however, than using an internally coated pervaporation membrane and passing the feed through the fibres, since the separation efficiencies are considerably poorer, owing to moderate hydrodynamic flow conditions on the feed side, and cleaning of the outside of the fibres is problematic.

The pressure on the permeate side is preferably kept below 30 mbar. Depending on the separation requirements, a permeate pressure of between 1 and 30 mbar is required. At lower pressures, more permeate will be collected, but at relatively high pressures, between 10 and 30 mbar, better separation efficiencies are possible.

As described above, it was found that for the method according to the invention a temperature of 30° C. or more gives statisfactory separation characteristics.

Preferably, the pervaporation process is carried out at a feed temperature of more than 60° C. So far, a temperature of between 30–80° C. has proved highly advantageous. This means that the feed (the food extract) during the pervaporation process has a temperature in the said range. Pervaporation preferably takes place at as high a temperature as possible, for example at the extraction temperature. A feed temperature above 80° C. is not possible at the moment, since present-day membrane materials available may become damaged above the said temperature. In principle, the pervaporation process is therefore not limited to feed temperatures up to 80° C.

It should therefore be understood that the pervaporation temperature may depend on the desired aromas to be obtained. If the aromatic substances in question are unstable above 60° C., for example, care should be taken to ensure that the pervaporation takes place below this temperature. The extraction should then obviously likewise take place at a temperature below 60° C.

The permeate is preferably obtained by cooling in a condenser system and by collecting it in liquid condensed form. This condensate mainly comprises water (or some other extractant used) and the desired aromas. The temperature at the condensation is preferably around −20° C. or below. At this temperature, most of the aromas condense from the permeate.

To obtain a concentrated aroma concentrate it is preferable for the permeate to be cooled in a first condenser at a temperature of between 0° C. and 15° C., preferably between 3° C. and 8° C., the copermeated water, in particular, being condensed from the permeate and the uncondensed material, which comprises the major fraction of the aromas, then being condensed at −20° C. or below, preferably below −80° C. In this two-stage condensation, the water is condensed at the higher temperature and is thus removed from the aroma.

In the second condensation step, the concentrate and any remaining water is condensed and thus collected. Whilst condensation is to be preferred for collecting the concentrate, other ways of binding the concentrate from the permeate are also known in the art, for example binding to a carrier such as activated carbon.

In particular, the invention relates to a method as described hereinabove for isolating cocoa aroma concentrate, wherein the food base material comprises a cocoa-comprising material, preferably cocoa powder.

The invention further relates to food aroma concentrate obtainable via the method according to the invention. In particular, such an aroma concentrate comprises less than 0.5% (w/w) of fat and is preferably substantially fat-free. As the pervaporation membrane is impermeable to fats, a food aroma is obtained which is substantially fat-free. (That means less than 0.05% (w/w) of fat.)

The invention further relates to a food aroma concentrate which comprises less than 0.005% (w/w) and preferably less than 0.001% (w/w) caffeine. The last-mentioned value corresponds to 0.01 g/l of the recovered condensate. It was found that the method according to the invention affords a food aroma concentrate comprising permeate which comprises less than 0.01 g/l of caffeine. The invention also relates to a food aroma concentrate which is obtainable via the method according to the invention and which, in analogy to the above-described, comprises less than 0.005% (w/w) theobromine and/or catechols, preferably less than 0.001% (w/w).

The invention further relates to a food aroma concentrate obtained in accordance with the method according to the invention, wherein the aroma has also been admixed with at least a portion of the retentate of the pervaporation. As already explained hereinabove, the retentate may still comprise important substances. In the case of recovering cocoa aroma concentrate according to the invention, the bitter flavourings, for example, substantially remain behind in the retentate. Whilst this is advantageous in obtaining a less bitter cocoa aroma, a small amount of the said bitter flavourings is desirable in certain cases to obtain a pleasant cocoa flavour. To obtain such an aroma, the said bitter flavourings can be added to the food aroma concentrate, for example in the form of the retentate of the pervaporation step. In a preferred embodiment, the invention relates to a food aroma which is obtainable in accordance with the method according to the present invention and which is cocoa aroma prepared from cocoa powder or some other cocoa-comprising food.

Cocoa aroma concentrates obtained according to the prior art have often been obtained via an alcoholic extraction and therefore have a considerably higher fat content. The cocoa aroma concentrates obtainable via the method according to the present invention, wherein substantially no fat is taken up into the extractant, are highly suitable, because of their low fat content, for foodstuffs whose fat content, for example, is critical. Moreover, the organoleptic taste sensation of the cocoa aroma concentrate according to the invention is considerably better than that of the present-day cocoa aroma concentrates. Moreover, the cocoa aroma concentrates according to the invention are soluble in water, colourless and, as explained hereinabove, substantially fat-, caffeine- and theobromine-free. Furthermore, the aroma concentrate according to the invention substantially comprises no microbiological activity, which represents a very high added value.

The invention further relates to a cocoa aroma concentrate which, on the basis of the total mass of the condensed material of a two-stage condensation, comprises less than 0.01% protein, less than 0.01% fibres and less than 0.05% sugars. In this context reference should be made to Table 2. Such a concentrate has not previously been known in the art and can be obtained by the method according to the invention. It was found that such a concentrate has optimal gustatory qualities and can advantageously be used in the bakery, dairy and soft-drinks industries. Present-day cocoa aroma concentrates are of inferior quality and more difficult to handle.

The invention further relates to a food and a food concentrate which comprises an aroma concentrate, in particular a cocoa aroma, according to the invention.

Table 1 below gives a schematic overview of the various characteristics of aroma concentrates obtained by liquid extraction, steam distillation, supercritical extraction and by pervaporation. Pervaporation is to be understood as a combination of liquid extraction, followed by pervaporation.

TABLE 1

Distinguishing characteristics of pervaporation aroma versus existing aromas
Properties of aroma concentrate from:

| Liquid extraction | Steam distillation | Supercritical extraction | Pervaporation |
|---|---|---|---|
| comprises suspended particles[1] | no suspended particles | no suspended particles | no suspended particles |
| brown in colour[2] comprises purines[3] and catechols; detectable (HPLC) | colourless purines + catechols; detectable (HPLC) | pale brown purines + catechols; detectable (HPLC) | colourless comprises no purines and catechols (not detectable by HPLC) |
| comprises proteins water-soluble[5] | comprises no proteins water-soluble | comprises no proteins not entirely water-soluble (presence of fat) | comprises no proteins water-soluble |
| possibility of microbiological activity | possibility of microbiological activity | possibility of microbiological activity | no possibility of microbiological activity |
| removal of extractant sometimes necessary[4] | removal of extractant unnecessary (= water) | removal of extractant unnecessary (= $CO_2$) | removal of extractant unnecessary (= water) |
| quality control difficult (temperature, time, extractant) | quality control possible by means of fractional condensation (difficult) | quality control possible by means of fractional collection of extract (fairly easy) | quality control possible by means of fractional condensation (easy) |
| thermal degradation does not take place brief shelf-life comprises fat | thermal degradation does take place brief shelf-life does not comprise fat | thermal degradation does not take place ? does comprise fat | thermal degradation does not take place long shelf-life does not comprise fat |
| maximum enrichment 'low' | maximum enrichment condensation-dependent | maximum enrichment condensation-dependent | maximum enrichment condensation-dependent |
| aroma profile dependent on concentration method of the aroma (see Example 4) | poor match of flavour profile | reasonable match of flavour profile | good match of flavour profile |

[1]Unless treated by means of ultrafiltration
[3]In particular the purines caffeine and theobromine present in cocoa.

TABLE 1-continued

Distinguishing characteristics of pervaporation aroma
versus existing aromas
Properties of aroma concentrate from:

| Liquid extraction | Steam distillation | Supercritical extraction | Pervaporation |
|---|---|---|---|

[4] Applies only if non-food-grade solvents have been used (whereas water, ethanol and isopropyl alcohol, for example, are food-grade substances)
[5] Only if a water-soluble extractant has been used (water, ethanol, isopropyl alcohol)

The above demonstrates that pervaporation differs from all the other extracts in that no purines and catechols are detected in the extract. In extracts obtained by means of methods other than pervaporation, said presence is detectable, in contrast, or at any rate it cannot be ruled out that they are present.

Liquid extraction was carried out in accordance with the following Example 1, steam distillation was carried out in accordance with (U.S. Pat. No. 3,579,349), the supercritical extraction was carried out in accordance with the following Example 6.

The pervaporation was carried out in accordance with Example 7.

The following Table 2 shows a characterization of the feed and the aroma concentrate in the case of a one-step concentration and a two-step condensation in accordance with the invention as carried out in accordance with Example 7.

TABLE 2

Characterization of feed and concentrates

| | | Feed (= liquid extract) | One-step condensation | Two-step condensation | |
|---|---|---|---|---|---|
| | | | Condenser 1 | Condenser 1 | Condenser 2 |
| Temperature | [° C.] | 35 | −196 | +5 | −196 |
| Period | [minutes] | 0 to 40 | 0 to 40 | 0 to 40 | 0 to 40 |
| Volume | [kg] | 30 | 0.39 | 0.17 | 0.22 |
| Fat | [grams]¹ | 360 | 0.0 | 0.0 | 0.0 |
| Colour | [—] | brown, turbid | colourless | colourless | colourless |
| Caffeine[2] | [g/l] | 0.1 | undet. (<0.01) | undet. (<0.01) | undet. (<0.01) |
| Theobromine[2] | [g/l] | 4.0 | undet. (<0.01) | undet. (<0.01) | undet. (<0.01) |
| Isovaleraldehyde[3] (IV) | [ppm][4] | 2.5–3.5 | 63–89 | 1.0–1.3 | 111–155 |
| Diacetyl (D)[3] | [ppm][4] | 0.4–0.6 | 7.1–11 | 1.2–1.8 | 12–18 |
| Isoamyl alcohol (IA)[3] | [ppm][4] | 0.05–0.10 | 1.4–2.8 | 0.3–0.7 | 2.2–4.4 |
| Benzaldehyde (B)[3] | [ppm][4] | 0.15–0.25 | 2.1–3.6 | 0.2–0.4 | 3.6–6.0 |
| Catechols[2,6] | [g/l] | 15.9 | undet. (<0.01) | undet. (<0.01) | undet. (<0.01) |
| Yield[5] | | | | | |
| IV | [%] | n/a | 30 | 0 | 30 |
| D | [%] | n/a | 22 | 2 | 20 |
| IA | [%] | n/a | 33 | 3 | 30 |
| B | [%] | n/a | 17 | 1 | 16 |

[1] Based on a fat content in the fatty N-11-N (trademark from ADM Cocoa BV, The Netherlands) powder of 12 wt %
[2] The concentrations of caffeine, theobromines and catechols were determined by means of HPLC analyses
[3] The four components mentioned are regarded, in the literature, as "key components" for the cocoa aroma. Isovaleraldehyde, in particular, is a compound having a major impact on the characteristic cocoa aroma.
[4] ppm = 'parts per million' based on weight, or [milligram/kg]. The concentrations stated were determined on the basis of results of dynamic-headspace GC and GC-MS analyses.
[5] The yield indicates how much of a substance present in the feed extract has actually been removed by means of the pervaporation process. A yield of 30% therefore means that 30% of the quantity present in the feed is present in the concentrate (=permeate), while 70% still remained in the retentate.
[6] Mainly catechol, epicatechol and epigallocatechol.

DETAILED DESCRIPTION OF THE INVENTION

The invention will be explained below in more detail with reference to a few examples.

EXAMPLE 1

Immersion Extraction of Cocoa Aroma with Hot Water, Determination of the Effect of the Extraction Temperature In a stirred 10 liter autoclave, 400 g of natural cocoa powder having a fat content of 10.5% and denoted by the type code N-11-N were admixed with 4 liters of demineralized water. The autoclave was sealed and the whole set-up then heated to the desired extraction temperature while being stirred intensively with a speed of 1000 rpm, followed by extraction over a period of 1 hour. After the extraction, the aqueous extract was separated from the residue with the aid of an ultracentrifuge at a speed of 30,000 rpm. An entirely clear extract was thus obtained. The clear extract was then inspissated to a thick paste by means of freeze-drying. The paste was then pasteurized at 80° C. to make it suitable for the tasting panel. In this way, four extractions were carried out at 90, 110, 125 and 150° C., respectively.

The pastes were assessed in terms of smell and taste in a tasting panel consisting of six persons. To this end, 2 g of paste were mixed with 100 ml of warm water of about 50° C. for each panel member. As a reference, a 2% strength suspension of the original cocoa powder was also assessed. The taste was assessed in terms of various top notes on a scale from 0 to 6, no taste being observed at 0 and the aroma aspect in question being very prominent at 6. The table below reproduces the results from the tasting panel.

| | Average panel scores | | | | |
|---|---|---|---|---|---|
| | Temperature | | | | |
| | 90° C. | 110° C. | 125° C. | 150° C. | Reference |
| Odour intensity | 2.0 | 2.5 | 1.0 | 0.7 | 4.0 |
| Top note | | | | | |
| Cocoa | 1.5 | 1.5 | 1.5 | 0.4 | 4.0 |
| Rounded | 1.0 | 1.5 | 0.2 | 0.2 | 2.2 |
| Bouquet | 1.5 | 1.5 | 0.1 | 0.0 | 0.5 |
| Acidic | 0.05 | 1.0 | 0.4 | 0.0 | 0.0 |
| Anomalous* | 0.0 | 0.0 | 0.3 | | 0.0 |
| Taste intensity | 1.5 | 2.0 | 1.5 | 0.3 | 4.0 |
| Cocoa | 2.0 | 2.5 | 1.5 | 0.2 | 4.0 |
| Bitter | 3.0 | 3.5 | 1.0 | 1.0 | 2.5 |
| Rounded | 1.0 | 1.0 | 0.0 | 0.5 | 2.0 |
| Bouquet | 0.5 | 1.0 | 0.0 | 0.0 | 1.0 |
| Acidic | 2.0 | 2.0 | 1.0 | 0.0 | 1.0 |
| Astringent | 1.0 | 0.5 | 1.0 | 2.0 | 0.5 |
| Anomalous* | 0.0 | 0.0 | 2.0 | 6.0 | 0.0 |
| | | | *caramel | *burnt milk | |
| Appearance | clear | clear | clear | clear | opaque, particles |

The results show that the best results were obtained at 110° C. At 125° C. and above an anomalous taste is produced which resembles burnt milk. At 90° C., aroma and taste are less intense. Compared with the reference, the aroma and taste intensity is less, with the exception of the "bitter" note, which is distinctly more prominent in the case of the aqueous extracts.

Notwithstanding advice to the contrary in the literature (K. H. Ney, Gordian, 1986 (11), 204–205), a good extract is obtained with an extraction above 100° C. (100–125° C., the preference being between 105–115° C.). At 125° C. and above, distinctive taste anomalies are obtained.

EXAMPLE 2

Immersion Extraction of Cocoa Aroma with Hot Water Determination of the Effect of the Extraction Time The extraction was carried out in the same way, using 500 g of cocoa powder, as in Example 1, except that the extraction was carried out at 110° C. and the extraction time was extended to 3 hours. After 1, 2 and 3 hours a sample was drawn which was worked up and assessed in the same way as in Example 1.

The table below gives the results of the tasting panel.

| | Average panel scores | | | |
|---|---|---|---|---|
| | Time (hours) | | | |
| | 1 | 2 | 3 | Reference |
| Odour intensity | 1.0 | 1.5 | 1.5 | 4.0 |
| Top note | | | | |
| Cocoa | 1.0 | 1.5 | 1.5 | 4.0 |
| Rounded | 1.0 | 1.0 | 1.0 | 2.2 |
| Bouquet | 0.0 | 0.0 | 0.0 | 0.5 |
| Acidic | 0.0 | 0.0 | 0.0 | 0.0 |
| Anomalous* | 0.0 | 0.0 | 0.3 | 0.0 |
| Taste intensity | 2.0 | 2.5 | 3.0 | 4.0 |
| Cocoa | 2.0 | 2.5 | 2.8 | 4.0 |
| Bitter | 3.5 | 3.5 | 3.5 | 2.5 |
| Rounded | 1.0 | 1.0 | 1.5 | 2.0 |
| Bouquet | 0.5 | 0.5 | 1.0 | 1.0 |
| Acidic | 2.0 | 0.5 | 0.0 | 1.0 |
| Astringent | 0.5 | 0.5 | 0.5 | 0.5 |
| Anomalous* | 0.0 | 0.0 | 0.0 | 0.0 |
| | | | *caramel | |
| Appearance | clear | clear | clear | opaque, particles |

The table shows that the taste strength, in particular, increases with time. After 3 hours, however, an anomalous taste begins to be observed in the aroma.

Extraction times of less than 1 hour give a lower yield. Longer extraction times lead to anomalies in taste.

EXAMPLE 3

Immersion Extraction of Cocoa Aroma with Hot Water, Pilot Plant-scale Experiment, Effect of Repeating the Extraction In this experiment, 6 kg of cocoa powder were extracted with 60 liters of demineralized water in a stirred 100 liter autoclave. The extraction was carried out at 110° C. over a period of 3 hours. After extraction, the extract was separated in a centrifuge at 2200 rpm. The residue from the centrifuge was re-extracted under identical conditions and was separated. The extract was then admixed with 0.1% of potassium sorbate to prevent the growth of mould during storage. Part of the extracts was inspissated by means of freeze-drying for the purpose of the taste being assessed in the tasting panel. In addition, a sample of the residue after the second extraction was drawn, which was treated in the same way as the reference.

The table below gives the results of the panel assessment.

| | Average panel scores | | | |
|---|---|---|---|---|
| | Extraction No | | | |
| | 1st extract | 2nd extract | 2nd residue | Reference |
| Odour intensity | 1.5 | 0.7 | 0.5 | 4.0 |
| Top note | | | | |
| Cocoa | 1.0 | 0.5 | 0.5 | 4.0 |
| Rounded | 1.0 | 0.4 | 0.3 | 2.2 |
| Bouquet | 0.0 | 0.0 | 0.0 | 0.5 |
| Acidic | 0.0 | 0.0 | 0.0 | 0.0 |
| Anomalous* | 0.0 | 0.0 | 0.3 | 0.0 |
| Taste intensity | 3.0 | 1.5 | 1.0 | 4.0 |
| Cocoa | 3.2 | 1.5 | 1.0 | 4.0 |
| Bitter | 3.5 | 3.0 | 2.0 | 2.5 |
| Rounded | 1.0 | 0.5 | 0.5 | 2.0 |
| Bouquet | 1.0 | 0.5 | 0.0 | 1.0 |
| Acidic | 0.5 | 0.5 | 1.5 | 1.0 |
| Astringent | 0.5 | 0.8 | 1.0 | 0.5 |
| Anomalous* | 0.0 | 0.0 | 0.0 | 0.0 |
| Appearance | turbid with particles | turbid with particles | turbid with particles | opaque, particles |

The table indicates that even on a pilot-plant scale it is possible to obtain good extraction, with a powerful cocoa aroma, under the stated conditions, with the exception of the "bitter" note, which again is more prominent than in the reference. As it was not possible to use an ultracentrifuge at this scale, the separation had to be carried out by means of an ordinary centrifuge, with the result that the extract was not entirely clear.

The residue after the second extraction has a weak cocoa taste. This indicates that by means of the immersion extraction using hot water the aroma components are removed effectively.

EXAMPLE 4

Immersion Extraction of Cocoa Aroma with Hot Water Pilot Plant-scale Experiment Effect of the Technique of Inspissating the Extract Portions of the extract of the pilot plant experiment in Example 3 were inspissated in various ways:
- by means of freeze-drying
- by means of freeze-drying, the extract having been clarified beforehand by means of microfiltration.
- by means of vacuum evaporation at 40° C.
- by means of reverse osmosis, the extract having been clarified beforehand by means of microfiltration.

The table below reproduces the results from the tasting panel.

| | Average panel scores | | | | |
|---|---|---|---|---|---|
| Inspissation | Freeze-drying | Freeze-drying | Vacuum dist. | Rev. osmosis | Reference |
| Microfiltration | no | yes | yes | yes | |
| Odour intensity | 1.5 | 1.5 | 0.5 | 2.5 | 4.0 |
| Top note | | | | | |
| Cocoa | 1.0 | 1.0 | 0.3 | 2.0 | 4.0 |
| Rounded | 1.0 | 1.0 | 0.2 | 1.0 | 2.2 |
| Bouquet | 0.0 | 0.0 | 0.2 | 0.0 | 0.5 |
| Acidic | 0.0 | 0.0 | 0.5 | 0.4 | 0.0 |
| Anomalous* | 0.0 | 0.0 | 0.0 | 0.0 | 0.0 |
| Taste intensity | 3.0 | 2.5 | 0.5 | 3.0 | 4.0 |
| Cocoa | 3.2 | 2.5 | 0.5 | 3.0 | 4.0 |
| Bitter | 3.5 | 4.0 | 4.0 | 4.0 | 2.5 |
| Rounded | 1.5 | 0.5 | 0.5 | 0.5 | 2.0 |
| Bouquet | 0.5 | 0.5 | 0.5 | 0.5 | 1.0 |
| Acidic | 0.5 | 1.0 | 1.0 | 0.0 | 1.0 |
| Astringent | 0.5 | 1.0 | 2.0 | 1.0 | 0.5 |
| Anomalous* | 0.0 | 0.0 | 0.0 | 0.0 | 0.0 |
| Appearance | turbid, particles | clear | clear, particles | clear, crystals | opaque, particles |

The results indicate that freeze-drying does afford an aroma concentrate having a good odour and taste, except that the taste is considerably more bitter compared with the reference. Moreover, the solution of the concentrate in water remains turbid, which is also less desirable. To counteract the turbidity, the aqueous extract was first clarified via a microfilter and then inspissated by means of freeze-drying. Now the concentrate did produce a clear solution. However, as the table shows, the cocoa aroma has considerably decreased and the taste notes "bitter", "astringent" and "acidic" have increased. All this indicates that the quality of the aroma considerably diminishes by this action.

When the concentrate is inspissated by means of vacuum distillation, the aroma and the taste are largely lost. Only the bitter, acidic and astringent components remain. This therefore is an unacceptable inspissation technique.

In the case of inspissation by means of reverse osmosis, the aroma and the taste were well preserved, except that the "bitter" note became more prominent. In the course of inspissation, however, crystalline material formed in the concentrate, causing clogging of the membrane and thereby considerably hampering industrial implementation, as the membrane had to be cleaned each time with a solution of dilute hydrochloric acid. When analysed, these crystals were found largely to consist of theobromine. This is a component which occurs in amounts of about 2 to 3% in cocoa and is co-extracted with hot water.

For the purpose of inspissation by means of freeze-drying the solid particles must first be separated off. This can be done effectively only with the aid of ultracentrifuging (Examples 1 and 2). This is a very expensive technique. If an ordinary centrifuge is used (Example 3), a clear extract is not obtained. To achieve this, the extract must first be filtered via an ultrafilter. This produces a loss in aroma.

Another drawback of inspissation by means of freeze-drying is that the aroma is very bitter, since the bitter components are co-extracted.

Concentration by vacuum evaporation results in a large loss of aroma components even at a low temperature of 40° C. Effectively, all that remains are the bitter and astringent components. Many of the literature references relate to the use of vacuum evaporation.

Concentration by means of reverse osmosis presents major problems on an industrial scale, because of crystallization of the theobromine. Furthermore, the aroma is again very bitter. Moreover, a clear extract can again be obtained only by ultracentrifuging.

EXAMPLE 5

Comparison of Various Extraction Techniques

In this experiment, various techniques of isolating the cocoa aroma from cocoa powder were compared with one another:

1. Immersion extraction as specified in Example 2 using an extraction time of 3 hours 2. Extraction using steam over a filter bed comprising cocoa powder.

100 g of cocoa powder of type N-11-N were mixed with 200 g of calcined sea sand to keep the filter bed open during the extraction. The mixture was introduced into a double-layer press filter of type Sietz Supra 2600, provided with paper filters S&S 589–2. After the filter had been sealed, open steam of 100° C. was forced through the filter bed.

This experiment had to be aborted, because the bed became entirely clogged owing to moisture being absorbed in the cocoa powder, despite the admixture of calcined sea sand. This extraction method was therefore not considered in the assessment.

3. Extraction by means of percolation with hot water 25 g of cocoa powder of type N-11-N were placed on a fluted filter. Then, four portions of 250 ml of demineralized water of 85° C. were poured onto the powder. The extracts were collected and inspissated by means of freeze-drying as specified hereinabove.

4. Extraction by means of refluxing in a Soxhlet extractor

The extraction sleeve was filled with 25 g of cocoa powder of type N-11-N, and the flask was charged with 100 ml of demineralized water, the powder subsequently being extracted for 4 hours under reflux. The extract was then inspissated by means of freeze-drying as specified earlier.

5. As with 4, using ethanol as the extraction fluid

After extraction, the ethanol was evaporated at room temperature in vacuo, and the residue was taken up in a small amount of water to produce a thick paste.

6. Supercritical extraction using $CO_2$

In a batch set-up for supercritical extraction, 120 g of cocoa powder were extracted, at a pressure of 175 bar and a temperature of 50° C., for 35 hours using 10,000 l of atmospheric $C_2$. The extract was collected in the decompression vessel at 60–80 bar. The extract obtained consisted of fat and was suspended in the warm water for the assessment.

Average panel scores

| Extraction method | Immersion | Steam | Percolation | Soxhlet | Soxhlet | Supercritical |
|---|---|---|---|---|---|---|
| Medium | water | water | water | water | ethanol | $CO_2$ |
| Odour intensity | 1.5 | — | 1.5 | 0.4 | 0.7 | 0.3 |
| Top note | | | | | | |
| Cocoa | 1.5 | not assessed | 1.6 | 0.4 | 0.5 | 0.3 |
| Rounded | 1.0 | — | 0.7 | 0.2 | 0.4 | 0.4 |
| Bouquet | 0.0 | — | 0.6 | 0.0 | 0.0 | 0.0 |
| Acidic | 0.0 | — | 0.0 | 0.0 | 0.0 | 0.0 |
| Anomalous* | 0.3 | — | 0.0 | 0.5 | 1.0 | 0.0 |
| Taste intensity | 3.0 | — | 1.0 | 0.2 | 0.2 | 0.5 |
| Cocoa | 2.8 | not assessed | 1.3 | 0.2 | 0.2 | 0.5 |
| Bitter | 3.5 | — | 1.2 | 2.5 | 2.2 | 0.7 |
| Rounded | 1.5 | — | 0.3 | 0.0 | 0.0 | 0.4 |
| Bouquet | 1.0 | — | 0.2 | 0.0 | 0.0 | 0.3 |
| Acidic | 0.5 | — | 0.5 | 0.0 | 0.0 | 0.9 |
| Astringent | 0.5 | — | 0.5 | 0.0 | 0.0 | 0.5 |
| Anomalous* | 0.0 | — | 0.0 | 0.5 *boiler water | 1.0 *ethanol | 0.0 |
| Appearance | clear | — | clear | clear | turbid, greasy | turbid, greasy |

The trials show that by far the best and most powerful aroma is obtained by means of immersion extraction at 110° C. Whilst percolation does in principle afford a good aroma, its extraction from the powder is highly incomplete. In the case of the Soxhlet extraction, a significant fraction of the aroma is lost, both with water and with ethanol. In the case of supercritical extraction, the yield of the extraction was very unsatisfactory.

EXAMPLE 6

Assessment of Aroma Concentrates of Various Aroma Producers Compared with Cocoa Powder of Type N-11-N in a Chocolate Coating Samples of cocoa aroma were obtained from three producers. These samples were assessed in a liquid white chocolate coating. The composition of the coating was as follows:

| Ingredient | Content |
|---|---|
| Saccharose | 40.30% |
| Coconut oil | 14.30% |
| Rapeseed oil | 22.80% |
| Skimmed-milk powder | 10.20% |
| Whey powder | 7.16% |
| Lactose | 5.00% |
| Emulsifier E322 | 0.20% |
| Vanillin aroma | 0.02% |
| Antioxidant E306 | 0.02% |

The aroma was admixed to the liquid coating in a percentage as stated in the table. They were tasted in comparison with reference 2. A negative number means that the aroma in question was characteristically less intense than the reference. In the case of a positive score it was more intense.

| Experiment No | 1 | 2 | 3 | 4 | 6 | 7 | 8 | 9 |
|---|---|---|---|---|---|---|---|---|
| Article No | 200 174 | 200 167 | 200 175 | 223 065 | Prova 3717 | Nec 60421 | Reference 1 | Reference 2 |
| Dose (%) | 0.2 | 0.12 | 0.2 | 0.08 | 1.00 | 1.00 | — | — |
| Cocoa powder (%) | 0 | 0 | 0 | 0 | 0 | 0 | 0 | 14 |
| Odour | | | | | | | | |
| Cocoa | −2.5 | −2.9 | −3.1 | −2.4 | −1.3 | −2.2 | −2.1 | 0.0 |
| Bouquet | −2.3 | −2.0 | −2.3 | −2.5 | −0.7 | −1.0 | −1.7 | 0.0 |
| Fullness | 0.3 | 0.7 | 1.0 | 1.9 | 0.6 | −1.8 | −0.3 | 0.0 |
| Different | nutty, milk, chocolate, intense vanilla | chemical, fruit, milk, nutty, old, liquorice | chemical, smoky, tart, milk, nutty | chemical, nutty, fruit, musty, old | mocha, unknown, musty, liquorice | vanilla, liquorice | milk, caramel | |
| Taste | | | | | | | | |
| Cocoa | −2.8 | −2.2 | −2.8 | −3.3 | −1.4 | −3.5 | −3.0 | −0.0 |
| Bitter | −3.3 | −2.6 | −3.0 | −3.0 | −2.4 | −0.7 | −3.3 | 0.0 |
| Fullness | −1.6 | −0.2 | −0.2 | −0.7 | −0.3 | −2.0 | −0.9 | 0.0 |
| Bouquet | −1.6 | −1.0 | −0.8 | −1.9 | 0.0 | −2.0 | −1.9 | 0.0 |
| Sweetness | 2.2 | 1.4 | 1.7 | 1.6 | 2.1 | +2.8 | 2.0 | 0.0 |
| Milky | 2.2 | 1.9 | 2.2 | 2.7 | 2.0 | +1.8 | 3.1 | 0.0 |
| Rounded | −1.8 | −2.6 | −2.6 | −2.4 | −1.4 | −1.6 | −2.0 | 0.0 |
| Different | buttery, tart | chemical, nutty, tart, burnt | chemical, nutty, tart, buttery | chemical, unpleasant, mocha, tart | mocha, burnt, unknown, vanilla | vanilla, liquorice | vanilla | |

The aromas tested in Exp. 1 to 5 inclusive are so-called nature-identical aromas from Haarman & Riemer. Experiment No 6 is a natural cocoa aroma from Prova SA. Experiment No 7 is a natural aroma from Nutritec.

As stated by the panel, the cocoa sensation is much weaker compared with cocoa powder and many differences in taste are found.

EXAMPLE 7

Liquid Extraction of the Pervaporation of Cocoa Powder

Extraction 50 kg of cocoa powder were added to 500 l of water at room temperature. Mixing produced a homogeneous mixture. The mixture was heated for 1 hour at 100° C. with continuous stirring, followed by cooling to 60° C. within 30 minutes. It is important that the extract be rapidly cooled after extraction, given the risk of thermal degradation of aromatic substances in the extract.

Pervaporation

The liquid extract was filtered with a 0.1 mm filter and then, at a temperature of 45° C., passed through a hollow-fibre module at a flow rate of 2 m³/h. The hollow fibres were internally coated with a PDMS layer having a thickness of 2 μm.

The module had the following properties:

| | |
|---|---|
| Membrane material: | hollow PDMS fibres |
| Internal diameter of hollow fibres: | 1.5 mm |
| Number of hollow fibres: | 227 |
| Length of module: | 70 cm |
| Total effective PDMS surface area: | 0.75 m². |

The feed side was subject to atmospheric pressure, the permeate side to a pressure of 7 mbar.

Condensation

The permeate was condensed in two steps, a first condenser operating at a temperature of +3° C., with about 95% of the permeated water being collected in said first condenser. The uncondensed permeate, viz. the remaining water, and the major fraction of the cocoa aromas were collected in a second condenser. This condenser operated at a temperature of −196° C. The yield of condensate, i.e. the contents of the second condenser, was about 175 g after 1.5 hours pervaporation. On the basis of instrumental analyses it could be established that enrichments of relevant aroma compounds in the extract in the second condenser were at an order of magnitude of 200–400 compared with the feed. The extract was colourless and had an intense cocoa aroma. Sensoric tests by an expert panel confirmed the enrichment found and the high quality of the product.

The drawbacks mentioned in Example 4 regarding the various inspissation methods do not apply to pervaporation. In the case of pervaporation a simple separation is carried out in which the bitter taste constituents remain in the retentate and may afterwards be added back to the cocoa aroma as desired, since the cocoa aroma requires the bitter components. Furthermore, virtually no loss of aromatic substances occurs with the aid of this method, as can be demonstrated with the aid of dynamic-headspace GC (DH-GC) analyses (Wampler, see above) and static-headspace GC (SH-GC) analyses.

DH-GC

For DH-GC, aroma concentrate and cocoa (D-II-A, from ADM Cocoa BV, Netherlands) were obtained in accordance with the above and a DH-GC analysis was carried out as follows (for details see Wampler hereinabove):

| Dynamic Headspace data | |
|---|---|
| type | Trekmar 3016, autosampler |
| amount of sample | 5 ml |
| purge gas | helium |
| purge flow | 36 ml/min |
| purge time | 12 min |
| purge temperature | ambient temperature |
| adsorbent | Vocarb 4000 |
| GC data | |
| GC type | new column |
| column type | CP-Wax 52 CB |
| column length | 50 m |
| film thickness | 1.2 μm |
| internal diameter | 0.32 mm |
| temperature program | 0–10 min: 40° C. constant |
| | 10–60 min: 40° C. → 190° C., 3° C./min |
| | 60–66 min: 190° C. → 250° C., 10° C./min |

Figure 1:
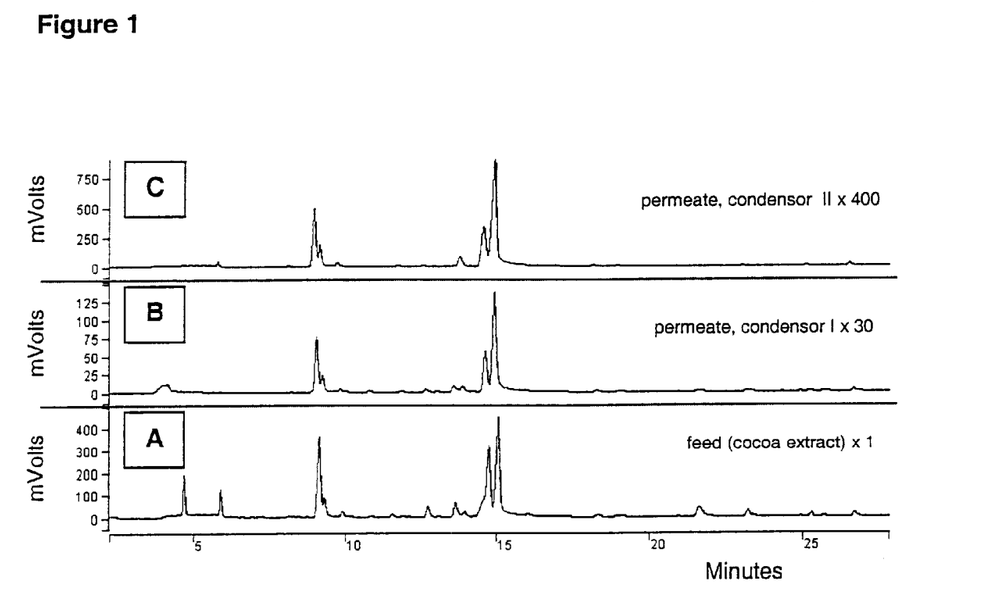
FIG. 1 shows chromatograms of samples of undiluted pervaporation feed (i.e. liquid cocoa extract) and of aroma concentrate diluted 30× and 400× as collected in first and second condensers. See Example 7.

Chromatograms of samples of the undiluted pervaporation feed (i.e. liquid cocoa extract) of aroma concentrate diluted 30× (with water) as collected in the first condenser and of a 400× dilution (with water) as collected in the second condenser, as shown in FIGS. 1A, B and C, respectively.

SH-GC

This technique can be compared with the P&T GC technique used earlier. In the case of DGI-GC, a small amount of vapour from the thermostatted headspace of the sample is injected directly into the GC. This method is quicker than the P&T-GC method, but provides reliable results, particularly for the volatile components.

Figure 2:
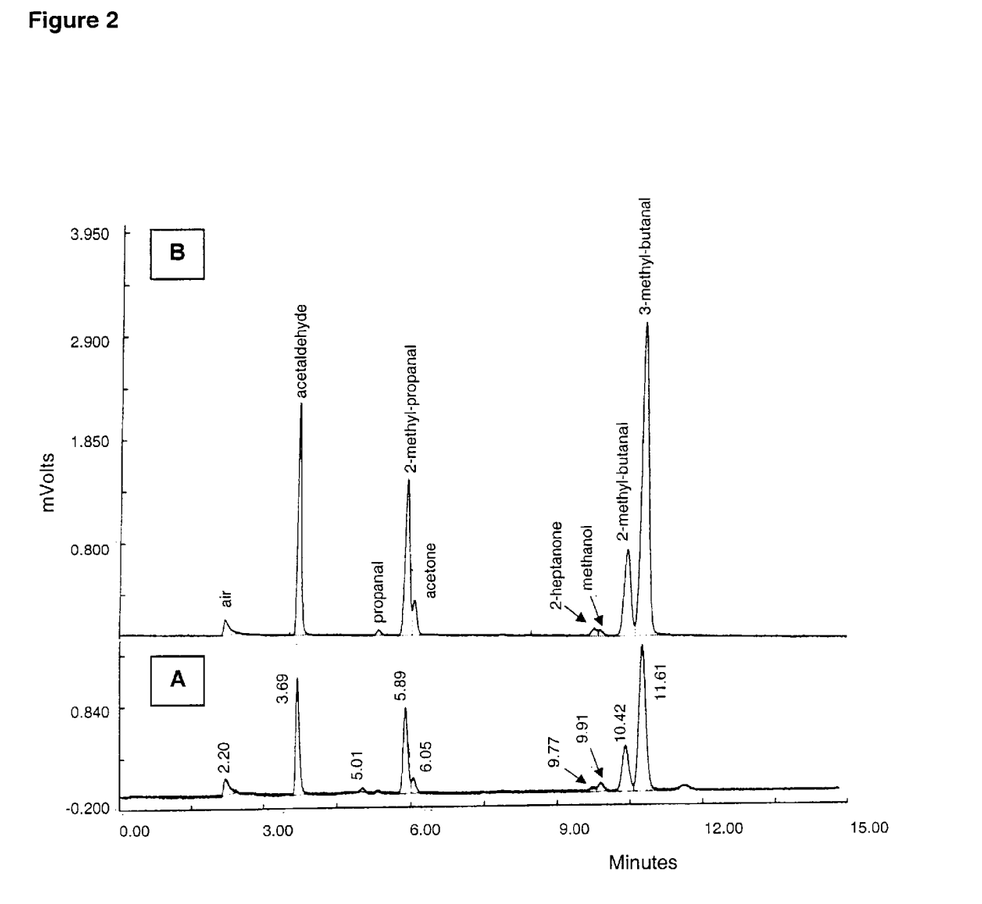
FIG. 2 shows chromatograms of undiluted pervaporation feed of cocoa powder and diluted permeate. See Example 7.

About 2 grams of a cocoa sample were weighed into a 40 ml glass vial and sealed with an aluminium screw cap having a Teflon® septum in the centre. The samples were equilibrated for 30 minutes, before 0.5 ml of the headspace was injected into the GC (1:10 split). An HS850 CE Instruments Autosampler was used, coupled to a Fisons 8533 GC. A 50m ×0.32 mm internal diameter ($d_f$=1.0 μm) DB-WAXETR (J&E Scientific) column was used for separating the samples, with a helium flow rate of 3.8 ml/min. The column temperature was kept isothermal during a run time of 15 minutes. The volatile components were detected by means of an FID detector at a temperature of 250° C. All measurements were carried out in duplicate or triplicate; the results are shown in FIG. 2.

FIG. 2A shows a chromatogram of undiluted pervaporation feed of cocoa powder N-11-N, and FIG. 2B is a chromatogram of permeate diluted by a factor of 5, in which extracts of condenser 1 and 2 were combined.

This clearly shows that the peak pattern after pervaporation (FIG. 1B and 1C, and FIG. 2B) substantially matches the pattern after extraction (FIG. 1A and FIG. 2A, respectively), which means that the concentration ratio of the aromatic substances in question in the condensate (i.e. after pervaporation) substantially matches the ratio in the extract.

What is claimed is:

1. Method for recovering aroma concentrate from a caffeine- or theobromine-comprising food base material, at least comprising:
    introducing the food base material into an aqueous extractant and incubating the food base material at a suitable temperature and for a suitable period, substantial extraction of aromas taking place to form an aqueous food extract, pervaporating the food extract using a hydrophobic pervaporation membrane to form a food aroma permeate, recovering the permeate to obtain the aroma concentrate, wherein the temperature of the extract and the permeate, respectively, during the pervaporation is more than 30° C.

2. Method according to claim 1, wherein the temperature during the extraction is between 90° C. and 125° C.

3. Method according to claim 1, wherein the thickness of the pervaporation membrane is at most 10 μm.

4. Method according to claim 1, wherein the pervaporation membrane comprises hollow fibres which are internally coated with at least one of poly(dimethylsiloxane) (PDMS) and ethylene-propylene-diene monomer (EPDM).

5. Method according to claim 1, wherein the temperature of the extract and the permeate, respectively, during the pervaporation is more than 60° C.

6. Method according to claim 1, wherein the recovery of the food permeate comprises:

a first condensation step of the permeate at a temperature of between 0° C. and 15° C., and a second condensation step of uncondensed material at −20° C. or below.

7. Method according to claim 1, wherein pervaporation is followed by the addition of at least a portion of the retentate of the pervaporation to the aroma concentrate.

8. Method according to claim 1 for isolating a cocoa aroma concentrate, wherein the food base material comprises a cocoa comprising material.

9. Food aroma concentrate, obtainable via the method according to claim 1.

10. Food aroma concentrate according to claim 9, wherein the aroma profile thereof substantially corresponds to that of the food base material.

11. Food aroma concentrate according to claim 9, wherein the food aroma contains less than 0.5% (w/w) fat.

12. Food aroma concentrate according to claim 9, wherein the food aroma concentrate contains less than 0.005 wt % of caffeine, and less than 0.005 wt % of theobromine and less than 0.005 wt % of catechols.

13. Food or food concentrate, respectively, which comprises an aroma concentrate according to claim 9.

14. Method according to claim 1, wherein the temperature during the extraction is between 100° C. and 125° C. and the thickness of the pervaporation membrane is at most 5 μm.

15. Method according to claim 1 wherein the temperature during the extraction is between 105° C. and 115° C. and the thickness of the pervaporation membrane is at most 3 μm.

16. Method according to claim 1 wherein the temperature during the extraction is between 105° C. and 110° C.

17. Method according to claim 1 wherein the temperature of the extract and permeate, respectively, during the pervaporation is between 80° C. and the extraction temperature.

18. Method according to claim 6 wherein said first condensation step of the permeate is at a temperature between 3 to 8° C., and said second condensation step is at less than −80° C.

19. Method according to claim 8 wherein said cocoa comprising material is cocoa powder.

20. Food aroma concentrate according to claim 11 which contains less than 0.05% (w/w) fat, less than 0.001 wt % of caffeine, less than 0.005 wt % of theobromine, and less than 0.001 wt % of catechols.

* * * * *